June 14, 1938.  H. S. HINCHMAN  2,120,248
CHARGING AND DISCHARGING VALVE
Filed Oct. 22, 1936   3 Sheets-Sheet 1
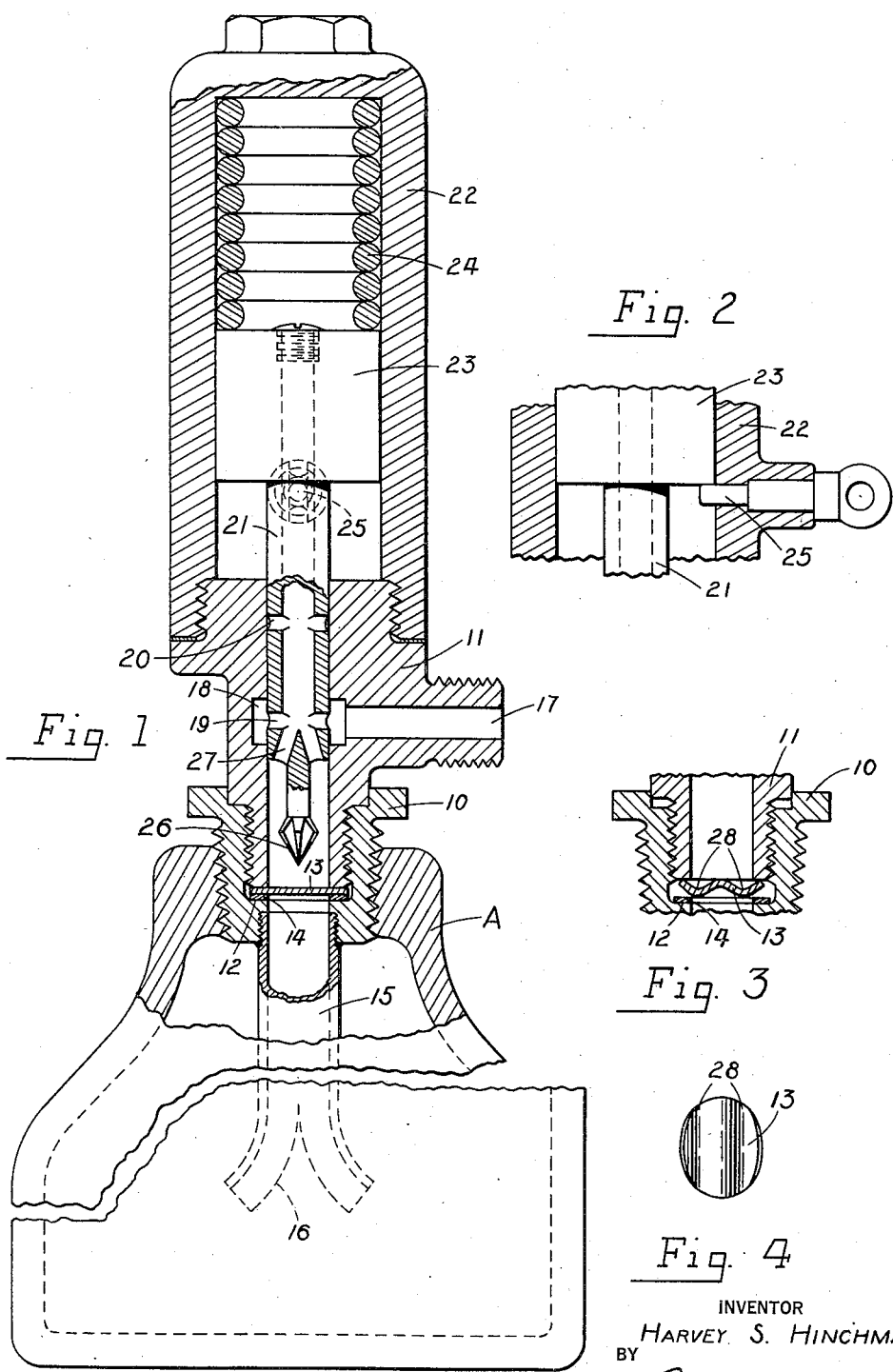
INVENTOR
HARVEY S. HINCHMAN
BY
ATTORNEY

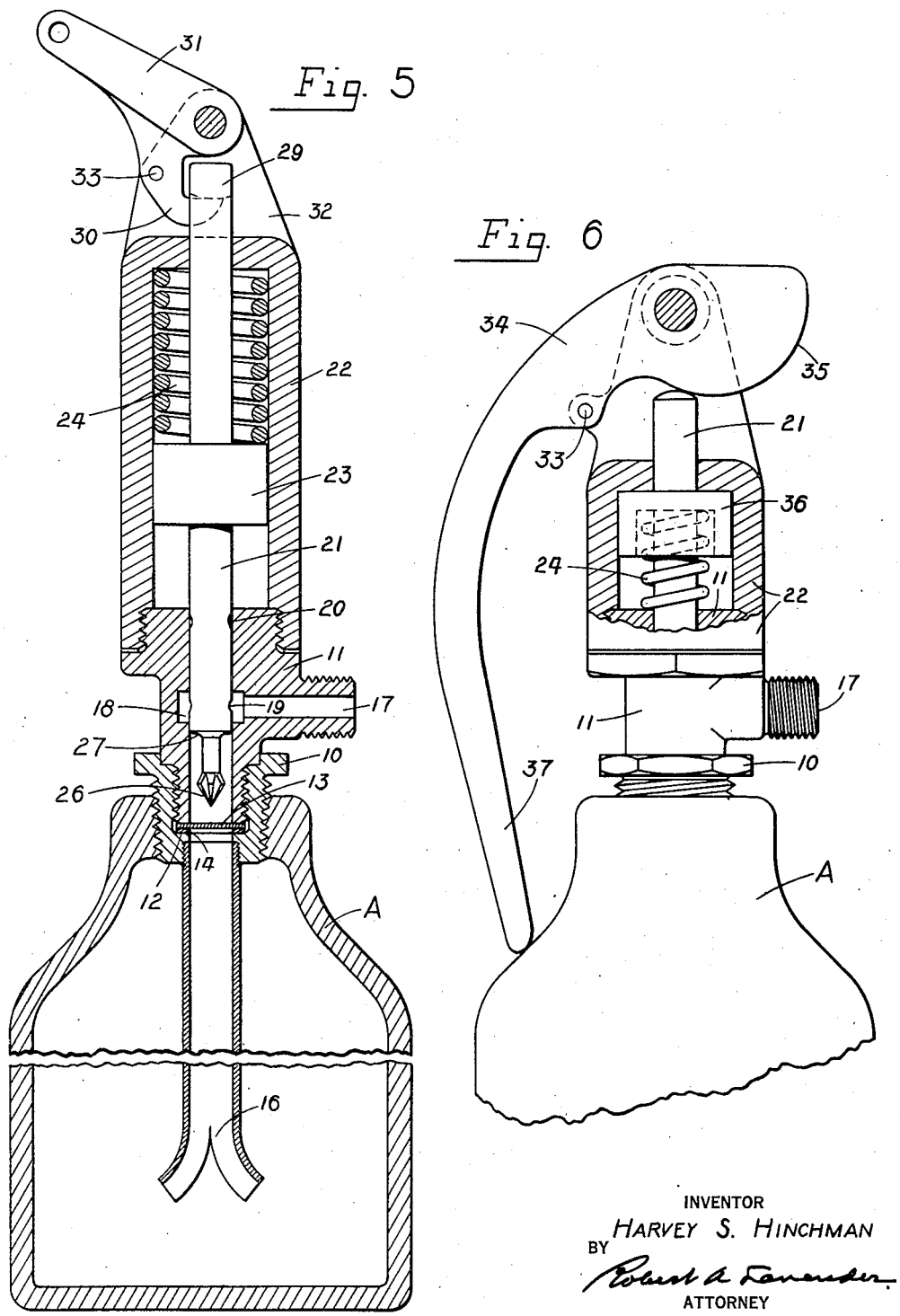

June 14, 1938.  H. S. HINCHMAN  2,120,248
CHARGING AND DISCHARGING VALVE
Filed Oct. 22, 1936   3 Sheets-Sheet 3

INVENTOR
HARVEY S. HINCHMAN
BY
ATTORNEY

Patented June 14, 1938

2,120,248

UNITED STATES PATENT OFFICE 2,120,248

CHARGING AND DISCHARGING VALVE

Harvey S. Hinchman, Merchantville, N. J.

Application October 22, 1936, Serial No. 107,039

12 Claims. (Cl. 221—73.5)

(Granted under the act of March 3, 1883, as amended April 30, 1928; 370 O. G. 757)

My invention relates to an improvement in valves, and more particularly to valves to be attached to containers holding a fluid at atmospheric pressure, or subjected to pressure or vacuum; positively sealed, and to be discharged at will.

An important object of my invention is to provide a quick, positive means for inflating life rafts, aircraft flotation gears and life jackets for use independently or in connection with parachutes; or to control the release for fire extinguishers, railway air brakes, steam boilers, or at any place or any condition where a positive, manually or mechanically operated relief or safety valve is required.

A further object of my invention is to provide such a means so that it may be used to charge or to discharge through the same orifice.

A still further object of my invention is to provide such a means so that it may be actuated by remote, direct, manual, mechanical or electric control.

Other objects and advantages of my invention will be apparent during the course of the following description:

In the accompanying drawings, forming a part of this specification and in which like numerals are employed to designate like parts throughout same, Fig. 1 is a central vertical section of a charging and discharging valve embodying my invention;

Fig. 2 is a fragmentary sectional view showing the arrangement of the tripping pin and enlarged head of plunger within the body member;

Fig. 3 is a fragmentary sectional view showing the arrangement of the fitting sealing disc and washer within the adapter, as used in charging;

Fig. 4 is a top view of the sealing disc as used when charging;

Fig. 5 is a central vertical section of my invention as modified by the use of a latch release in place of the tripping pin;

Fig. 6 is a central vertical partially sectional view of my invention as modified by the use of a cam release in place of the tripping pin;

Figure 7:
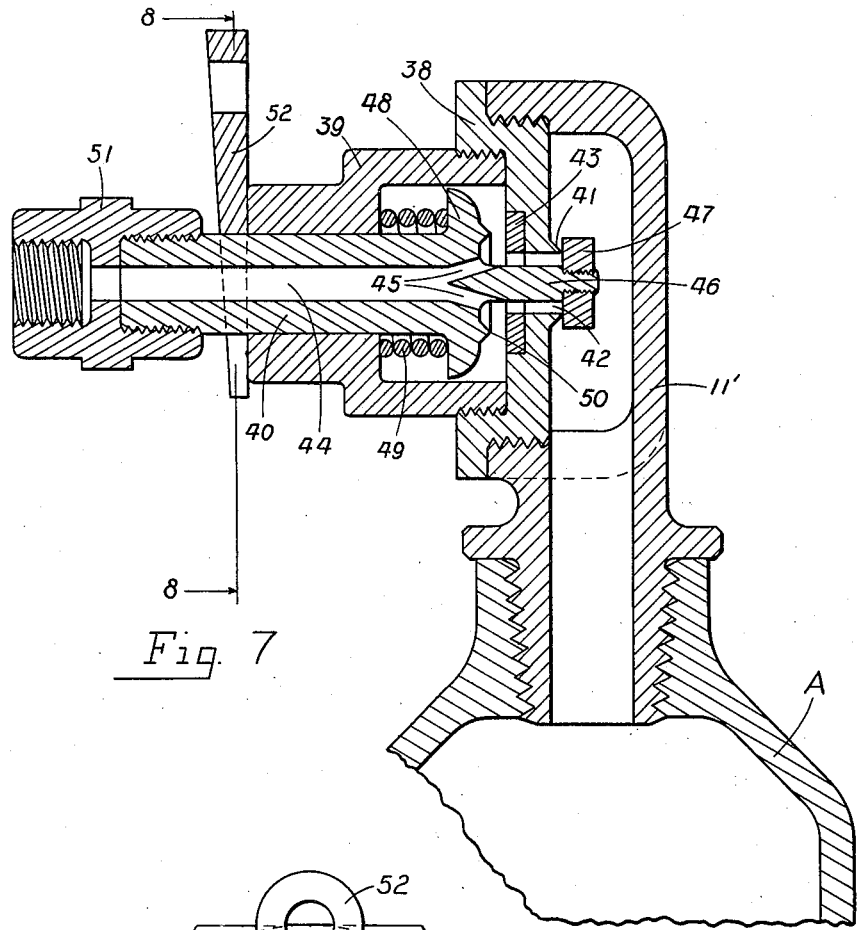
Fig. 7 is a central vertical sectional view of my invention as modified by the use of a wedged valve in place of the piercing valve.
Figure 8:
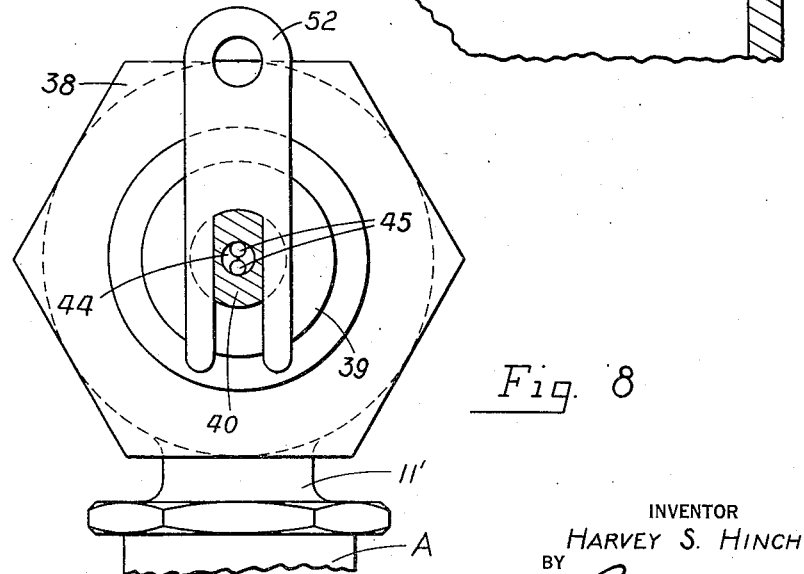
Fig. 8 is a sectional view through line 8—8 of Fig. 7.

In the drawings, wherein for the purpose of illustration, is shown preferred embodiments of my invention, the letter A designates a flask or container to which the assembled valve of the present invention is attached by means of an adapter 10, threaded into the mouth of the container A. The bore of the adapter 10 is threaded to receive a fitting 11, and is provided with a shoulder 12 to support a sealing disc 13 and a washer 14. The lower portion of the bore of the adapter 10 is threaded to receive a tube 15 depending into the container and split and bent at its free end, as at 16, to form a bell shaped mouth facilitating the entrance of the fluid into the container.

The bore of the fitting 11 has a diameter equal to the diameter of the reduced portion of the bore of the adapter 10 and of the bore of the tube 15, so as to provide a continuous smooth surface through these interconnected parts. A charge or discharge port 17 leads from the bore of the fitting 11 to the atmosphere, or to a suitable connection that may be applied thereto. The port leads into a channel or groove 18 extending circumferentially of the bore of the fitting 11 and which is larger in diameter than that of the port 17 to assure the alignment of wasting ports 19 or 20, as the case may be, in plunger 21 with the port 17.

A body member 22, mounted in any suitable manner to the fitting 11, is bored to receive head 23 of the plunger 21 which is normally held in an uppermost position within the body member 22 against the tension of a spring 24 interposed between the head 23 and the closed end of the body member by a pin 25 passing through the body member 22 and resting against the under side of the head 23, as may be seen more clearly in Fig. 2. When the pin 25 is withdrawn the expansion of the spring 24 causes the plunger 21 to be impelled through the sealing disc 13, permitting the escape of the contents of the container A. The actuating mechanism to withdraw the pin 25 may be either remote, direct, manual, mechanical or electrical, depending upon the circumstances for which the contents of the container may be desired.

In order that the plunger 21 may pierce the sealing disc 13, as stated above, the plunger is provided with a stellate end 26, consisting of a number of cutting edges and flutes, all running to a common point at the apex. From the apex for a distance to a circular section the end is preferably conical, but other shaped ends may be used. From this circular section, which normally represents the base of a cone, the upper end tapers to a stem of smaller area than the maximum area of a circle representing the largest diameter of the stellate end. The plunger itself is hollow and is provided with a series of ports 27 through which access is had between the container A and ports 19 or 20, and thence to port 17 by way of groove 18.

The sealing disc 13 showing the arrangement of the flutings or corrugations 28 before being compressed into a sealing position, is shown in Figs. 3 and 4. As will be seen, the flutings or corrugations 28 extend transversely of the disc 13, so that when in a position whereby the container may be filled, as will later be explained, the entering fluid will flow into the flutings or corrugations 28 and spill over their ends into the container A through the tube 15. This is possible because the fitting 11 makes but a point contact with the upturned periphery of the disc 13. When the fitting 11 is tightened into the adapter 10, it compresses the disc 13 into the flattened position shown in Fig. 1.

In Figs. 5 and 6 are shown modified ways of releasing the plunger so that it may perform its piercing operation. In each of these modifications the general construction of the valve is similar to that described in connection with Fig. 1, so only the differences in the plunger release will be described in connection with Figs. 5 and 6.

As shown in Fig. 5, the plunger 21 extends through the end of the body member 22 and is provided with a capped head 29 under which a claw or claws 30 of a latch member 31 engages. The latch is pivotally mounted to a bracket 32 carried by the body member 22. When the latch is released, spring 24 actuates the plunger 21 to pierce the sealing disc 13. The spring is held compressed between the end of the body member 22 and the plunger head 23 by the latch 31 engaging the capped head 29. The latch 31 is secured against premature release by a suitable securing means passing through registering openings 33 in the latch 30 and the bracket 32.

In Fig. 6 a positive pressure is applied to the plunger 21 through a pivoted lever 34 which is provided with a handle 37 and a cam-shaped head 35, which engages the plunger 21. The plunger 21 is held in engagement with the cam-shaped head 35 by spring 24 seated between a collar 36 carried by the plunger 21 and the fitting 11. Upward movement of the handle 37 causes the head 35 to actuate the plunger 21 to pierce the sealing disc 13.

Fig. 7 shows a slightly different construction of a valve for releasing the contents of container A. In this view the fitting 11' is mounted directly into the mouth of the container A and the valve unit is detachably mounted in the fitting. The valve unit consists of three parts, one being the part 38, which may be termed the seat; another being the part 39, which will be called the valve housing; and the third being the part 40, which is called the plunger. The seat part 38 is attached to the fitting 11' and contains as an integral part a knife edge 41 around a central bore 42 so constructed as to permit the fluid contents of the container A to flow around the reduced part of the plunger 40. The face opposite that containing the knife edge 41 is recessed to receive a tightly fitting washer 43, made of soft metal or other suitable material.

The valve housing 39 is screw fitted into the seat part 38, as shown, and is bored to receive the enlarged part of the plunger 40. The plunger 40 is cylindrical, or of some other convenient shape, and has a hole or groove 44 running partially through it and terminating with holes or ports 45 leading to the outer edge of the solid portions 46 of the plunger 40 to which is attached a nut 47 of some soft metal or other suitable material, so arranged that when the valve is closed it and the knife edge 41 form a tight seal. At a distance from the end of the plunger 40 is a shoulder 48 which, with the enclosed end of the valve housing 39, supports a spring 49. A knife edge 50 forms an integral part of the under side of the shoulder 48 and is so constructed that when the valve is open it forms a tight seal with the washer 43. The spring 49 is used as a means to force the plunger 40 open against the pressure of the fluid in the container A, and at the same time to engage the knife edge 50 with the washer 43, thus sealing the cavity around the ports 45 and assuring a positive flow of the contents of the container A through the groove 44, and at the same time preventing any escape of the fluid to the atmosphere. The plunger 40 is so constructed as to permit it to move freely through the bore of the valve housing 39. An exterior fitting 51 is secured to the protruding end of the plunger 40. The outside surface of the plunger 40 is conveniently slotted to receive a split wedge 52 which is used to force the plunger 40 partially out, which in turn forces the nut 47 against the knife edge 41 and seals the valve against the escape of the contents of the flask A.

The operation of the charging and discharging valve is as follows:

Referring to Figs. 1, 5 and 6. To charge: With the valve assembly removed from the adapter 10, the sealing disc 13 is placed in the recess of the adapter and upon the washer 14. The valve assembly is then screwed into the adapter until its end makes contact with the flutings or corrugations 28 of the washer 14. The fluid is then inserted through the port 17. It passes along through the groove 18, the ports 19, the ports 27, over the edge of the disc 13, thence through the tube 15 and out of the bell shaped mouth 16 into the flask or container A. When the flask or container is charged to the desired amount the valve assembly is screwed up tightly. This flattens out the sealing disc 13, thus forming a perfect seal.

To discharge: The plunger 21 is caused to travel in a direction toward the sealing disc 13 by either the removal of the pin 25 in Fig. 1, the releasing of the latch member 31 of Fig. 5, or the lifting of the handle 37 of Fig. 6. This motion of the plunger 21 causes its stellate end 26 to pierce the sealing disc 13. The result of this will be the flowing of the fluid from the container A through the connected openings out of the ports 20, which have now traveled down to oppose the groove 18, and thence out of the port 17.

Referring to the modification of the invention, as shown in Fig. 7,

To charge: The split wedge 52 is removed and the fluid is caused to enter through the exterior fitting 51. It then passes along the groove 44, through the ports 45, into the central bore 42, past the knife edges 41, into the open portion of the fitting 11' and into the container A. When the flask or container A is charged to the desired amount, the split wedge 52 is inserted in the slots of the plunger 40 and forced in sufficiently to cause the plunger 40 to be pulled out a sufficient amount to cause the nut 47 to engage the knife edge 41 and form a perfect seal.

To discharge: The split wedge 52 is withdrawn, allowing the tension of the spring 49 to force the plunger 40 along the bore of the valve housing 39, lifting the nut 47 from the knife edge 41 and at the same time forcing the knife edge 50 onto the washer 43. The fluid in the container A is then free to flow out in the reverse of the order described in the above paragraph for charging.

Other modifications and changes in the proportions and arrangements of the parts may be made by those skilled in the art without departing from the nature and scope of the invention, as defined in the appended claims.

The invention described herein may be manufactured and used by or for the Government of the United States of America for governmental purposes without the payment of any royalties thereon or therefor.

Having thus set forth and disclosed the nature of this invention, what is claimed is:

1. In combination with a fluid container having an opening therein, a tubular member mounted in said opening, a fluted sealing disc mounted in said member, a tubular flattening means carried by said tubular member for flattening said fluted disc for sealing the said fluid container against leakage, and puncturing means slidably mounted for longitudinal movement within said flattening means and adapted to be released for the purpose of puncturing said sealing disc to set free the fluid in said container.

2. In combination with a fluid container having an opening therein, a tubular member mounted in said opening and carrying a fluted sealing disc adapted to be flattened for sealing said fluid container against leakage, and puncturing means slidably mounted for longitudinal movement within said flattening means and adapted to be released for the purpose of puncturing said sealing disc to set free the fluid contents of said container.

3. In combination with a fluid container having an opening therein, a tubular member mounted in said opening, a fluted sealing disc mounted in said member, a tubular flattening means carried by said tubular member for flattening said fluted disc for sealing the said fluid container against leakage, and stellate pointed means slidably mounted for longitudinal movement within said flattening means and adapted to be released for the purpose of puncturing said sealing disc to set free the fluid in said container.

4. In combination with a fluid container having an opening therein, a tubular member mounted in said opening, a fluted sealing disc mounted in said member and adapted to be flattened for sealing said container, a tubular flattening means carried by said tubular member for flattening said fluted disc for sealing the said fluid container against leakage, puncturing means slidably mounted for longitudinal movement within said flattening means and adapted to be released for the purpose of puncturing said sealing disc to set free the fluid in said container, and spring actuated means for operating said puncturing means.

5. In combination with a fluid container having an opening therein, a tubular member mounted in said opening, a fluted sealing disc mounted in said member and adapted to be flattened for sealing said container, a tubular flattening means carried by said tubular member for flattening said fluted disc for sealing the said fluid container against leakage, puncturing means slidably mounted for longitudinal movement within said flattening means and adapted to be released for the purpose of puncturing said sealing disc to set free the fluid in said container, spring actuated means for operating said puncturing means, and removable tripping means for releasing said spring actuated means.

6. In combination with a fluid container having an opening therein, a tubular member mounted in said opening, a fluted sealing disc mounted in said member and adapted to be flattened for sealing said container, a tubular flattening means carried by said tubular member for flattening said fluted disc for sealing the said fluid container against leakage, puncturing means slidably mounted for longitudinal movement within said flattening means and adapted to be released for the purpose of puncturing said sealing disc to set free the fluid in said container, spring actuated means for operating said puncturing means, and pivoted latch means for releasing said spring actuated means.

7. In combination with a fluid container having an opening therein, a tubular member mounted in said opening, a fluted sealing disc mounted in said member and adapted to be flattened for sealing said container, a tubular flattening means carried by said tubular member for flattening said fluted disc for sealing the said fluid container against leakage, puncturing means slidably mounted for longitudinal movement within said flattening means and adapted to be released for the purpose of puncturing said sealing disc to set free the fluid in said container, spring actuated means for operating said puncturing means, pivoted latch means for releasing said spring actuated means, and securing means to guard against premature release of the latch.

8. In combination with a fluid container having an opening therein, a tubular member mounted in said opening, a fluted sealing disc mounted in said member and adapted to be flattened for sealing said container, a tubular flattening means carried by said tubular member for flattening said fluted disc for sealing the said fluid container against leakage, puncturing means slidably mounted for longitudinal movement within said flattening means and adapted to be caused to puncture said sealing disc to set free the fluid in said container, and a pivoted cam shaped operating means abutting thereto for actuating said puncturing means.

9. In combination with a fluid container having an opening therein, a tubular member mounted in said opening, a fluted sealing disc mounted in said member and adapted to be flattened for sealing said container, a tubular flattening means carried by said tubular member for flattening said fluted disc for sealing the said fluid container against leakage, puncturing means slidably mounted for longitudinal movement within said flattening means and adapted to be caused to puncture said sealing disc to set free the fluid in said container, pivoted cam shaped operating means abutting thereto for actuating said puncturing means and spring means normally withholding said puncturing means from contact with said sealing disc.

10. In combination with a fluid container having an opening therein, a tubular member mounted in said opening, a fluted sealing disc mounted in said member and adapted to be flattened for sealing said container, a tubular flatening means carried by said tubular member, puncturing means slidably mounted for longitudinal movement within said flattening means and adapted to be caused to puncture said sealing disc to set free the fluid in said container, pivoted cam shaped operating means abutting thereto for actuating said puncturing means, spring means normally withholding said puncturing means from contact with said sealing disc, and means to guard against premature release of the operating means.

11. In combination with a fluid container having an opening therein, a tubular member mounted in said opening, a fluted sealing disc mounted in said tubular member, and a flattening means carried by said tubular member for flattening said fluted disc for sealing the said fluid container against leakage.

12. For use in a fluid container having an opening therein; a member for sealing fluids in the container comprising a thin piece of corrugated material adapted to be flattened, said member, in corrugated condition, providing a through passage for the fluid; and said member, in flattened, unruptured condition, providing a seal against leakage of the fluid.

HARVEY S. HINCHMAN.